(12) United States Patent
Chao et al.

(10) Patent No.: US 6,622,159 B1
(45) Date of Patent: Sep. 16, 2003

(54) METHOD, APPARATUS AND COMPUTER PROGRAM PRODUCT FOR AUTOMATICALLY RESTARTING AN RPC SERVER WITHOUT LOSING CLIENT RPC CALLS

(75) Inventors: Tian-Jy Chao, Bedford, NY (US); Mark D. Cooper, Poughkeepsie, NY (US); Kenneth H. Warner, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,066

(22) Filed: Jun. 30, 1999

(51) Int. Cl.[7] ................................. G06F 15/16
(52) U.S. Cl. ................ 709/203; 709/220; 709/221; 709/242; 709/246; 709/330; 717/168
(58) Field of Search ................. 709/203, 246, 709/242, 219, 223, 221, 220, 222, 200, 201, 229, 330, 331; 717/168

(56) References Cited

U.S. PATENT DOCUMENTS

| | | | | |
|---|---|---|---|---|
| 5,375,206 A | * | 12/1994 | Hunter et al. | 717/176 |
| 5,915,112 A | * | 6/1999 | Boutcher | 709/330 |
| 6,006,034 A | * | 12/1999 | Heath et al. | 717/170 |
| 6,070,012 A | * | 5/2000 | Eitner et al. | 717/168 |
| 6,154,878 A | * | 11/2000 | Saboff | 717/11 |

OTHER PUBLICATIONS

"OSF DCE Application Development Guide, Revision 1.0", Open Software Foundation, 1993, Chapter 9, pps. 1–15.

"OSF DCE Application Development Guide, Revision 1.0", Open Software Foundation, 1993, Chapter 12, pps. 1–4.

"TCP/IP Illustrated, vol. 1—The Protocols", Richard W. Stevens, Chapter 1, pps. 1–19.

* cited by examiner

*Primary Examiner*—Frantz B Jean
(74) *Attorney, Agent, or Firm*—Andrew Wojnicki, Jr., Esq.; Lily Neff, Esq.; Heslin Rothenberg Farley & Mesiti P.C.

(57) ABSTRACT

Continuous server service is provided during switching from a current server version to a new server version. After initiating switching, a socket associated with the current server version is left open so that the socket may continue to receive client calls. The socket is then associated with the new server version and client calls received during switching are buffered and subsequently processed by the new server version after switching is complete.

49 Claims, 5 Drawing Sheets fig. 1 fig. 2 fig. 3 fig. 4 fig. 5

METHOD, APPARATUS AND COMPUTER PROGRAM PRODUCT FOR AUTOMATICALLY RESTARTING AN RPC SERVER WITHOUT LOSING CLIENT RPC CALLS

TECHNICAL FIELD

This invention relates, in general, to switching server versions in a distributed environment and, in particular, to providing continuous server service to client calls when switching from a current server version to a new server version.

BACKGROUND ART

In a distributed environment, socket-based server applications or remote procedure call (RPC) servers are generally arranged to receive and subsequently process remotely-made client calls. Typical RPC servers allow for numerous client TCP/IP (Transmission Control Protocol/Internet Protocol) network connections and are implemented to address a large number of client requests. A typical arrangement for these servers is to establish a local network representation by binding a socket to a fixed port which allows client calls to be received by the server.

From time to time, the servers are required to be updated from a current server version to a new server version in order to enhance server functionality or to address any server problems. These updates are performed by first shutting down the current server version, and subsequently starting the new server version. However, client requests cannot be processed immediately after the current server version stops listening for client requests and closes its socket. Per TCP/IP architecture, before the socket may close, it must wait for a period of time before allowing the local network representation.(i.e., the local IP address and port number) to be reused. This prevents the new server version from immediately binding again to the same fixed port number. Only when the new server version is able to bind to the port number and listen for client calls on the socket can the server process client requests. As a result, any client calls received during this time are unable to be processed by either the current server version or the new server version. Thus, client calls received during this time are not processed and are instead returned to the clients with an error message indicating that the server is not available.

In mission critical systems, running twenty-four hours a day, seven days a week, continuous service is vital and such a loss of service is not tolerable. Thus a need exists for a system and a method which provide continuous server service during switching from a current server version to a new server version in a distributed environment.

SUMMARY OF THE INVENTION

The shortcomings of the prior art are overcome to some extent through provision of an address reuse socket option which has been implemented to allow the socket associated with the current server version to be reused by the new server version without having to wait for the socket to completely time out. Thus with the address reuse socket option, client calls may be received immediately after the new server version has completed its start up procedures.

Additional shortcomings of the prior art are overcome and further advantages are provided through the provision of a method of providing continuous server service during switching from a current server version to a new server version in a distributed environment. The current server version receives client calls through an associated static port with a socket bound thereto. The method includes: initiating switching from the current server version to the new server version while maintaining the socket open for receiving client calls; buffering any received client calls during switching from the current server version to the new server version; and upon switching to the new server version, processing any buffered client calls.

In another aspect of the invention, a method of providing continuous server service during switching from a current server version to a new server version, in a distributed environment, is disclosed. The current server version receives client calls through an associated static port with a socket bound thereto. The method includes: receiving client calls during switching from the current server version to the new server version by leaving the socket open; associating the static port with the socket bound thereto with the new server version; and processing by the new server version, any client calls received during switching so that no client calls are lost.

In yet another aspect of the invention, a system capable of providing continuous server service during switching from a current server version to a new server version, in a distributed environment is disclosed. The a system includes: a server having a static port with a socket bound thereto which is associated with the current server version, the server being operable to leave the socket open when the current server version is switched to the new server version so that the server is able to continue to receive client calls received through the socket during switching, the server further comprising a buffer adapted to queue client calls received during switching from the current server version to the new server version, wherein the server is adapted to have the new server version process any queued client calls received during switching after switching to the new server is complete.

In yet another aspect of the invention, a system for providing continuous server service during switching from a current server version to a new server version, in a distributed environment is disclosed. The current server version receives client calls through an associated static port with a socket bound thereto. The system includes: means for initiating switching from the current server version to the new server version while maintaining the socket open for receiving client calls; means for buffering any received client calls during switching from the current server version to the new server version; and means for processing, upon switching to the new server version, any buffered client calls.

In yet another aspect of the invention, a system for providing continuous server service during switching from a current server version to a new server version, in a distributed environment is disclosed. The current server version receives client calls through an associated static port with a socket bound thereto. The system includes: means for receiving client calls during switching from the current server version to the new server version by leaving the socket open; means for associating the static port with the socket bound thereto with the new server version; and means for processing, by the new server version, any client calls received during switching so that no client calls are lost.

In yet another aspect of the invention, an article of manufacture is provided. The article of manufacture comprises a computer useable medium having computer readable program code means embodied therein causing the providing of continuous server service during switching from a current server version to a new server version, in a distributed environment, where the current server version receives client calls through an associated static port with a socket bound thereto. The computer readable program code means in the article of manufacture includes: computer readable program code means for causing initiating switching from the current server version to the new server version while maintaining the socket open for receiving client calls; computer readable program code means for causing buffering of any received client calls during switching from the current server version to the new server version; and computer readable program code means for causing, upon switching to the new server version, processing of any buffered client calls.

In yet another aspect of the invention, an article of manufacture is provided. The article of manufacture comprises a computer useable medium having computer readable program code means embodied therein causing the providing of continuous server service during switching from a current server version to a new server version, in a distributed environment, where the current server version receives client calls through an associated static port with a socket bound thereto. The computer readable program code means in the article of manufacture includes: computer readable program code means for causing receiving client calls during switching from the current server version to the new server version by leaving the socket open; computer readable program code means for causing associating of the static port with the socket bound thereto with the new server version; and computer readable program code means for causing processing, by the new server version, of any client calls received during switching so that no client calls are lost.

Thus, presented herein is a method and system for providing continuous server service during switching from a current server version to a new server version. In order to provide such continuous server service the method and the system leave open sockets associated with the current server version during switching from the current server version to the new server version so that client calls made during switching continue to be received. In addition, leaving open the socket associated with the current server version allows the new server version to utilize the socket without having to perform standard startup procedures. Furthermore, any client calls received during switching are buffered so that they may be subsequently processed by the new server version upon completion of switching. By buffering the client calls made during switching and subsequently processing the buffered client calls, no client calls are returned with error messages to their respective clients. Hence, in the present invention, no client calls are lost during switching and, as a result, server versions may be updated to enhance functionality and to address server problems with the appearance of continuous server service.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with the principles of the present invention, continuous server service is provided during switching from a current server version to a new server version. One example of a distributed environment incorporating and using the present invention is described in detail with reference to FIG. 1.

Figure 1:
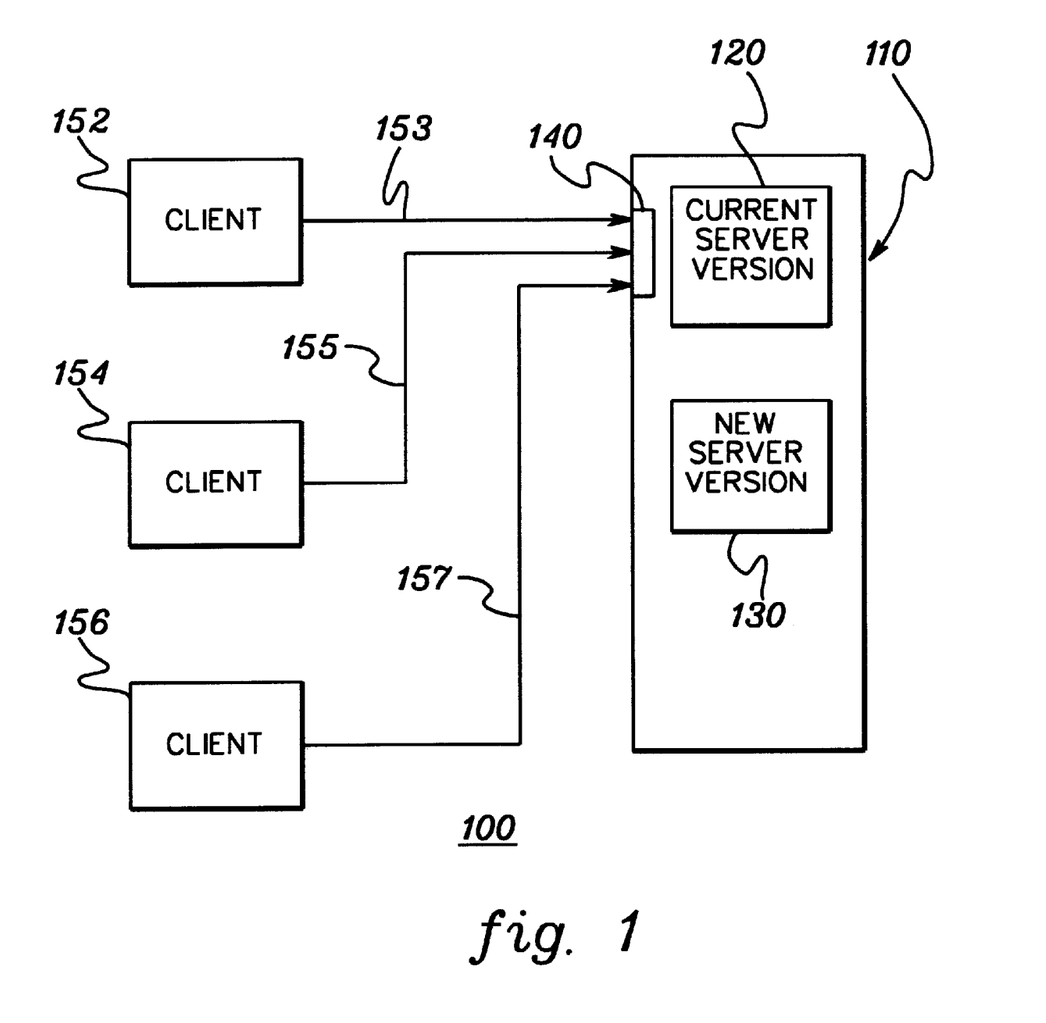
FIG. 1 depicts one example of a distributed environment implementing and using the continuous server service of the present invention.

FIG. 1 depicts one example of a distributed environment 100 incorporating the continuous server service of the present invention. In this embodiment, distributed environment 100 includes a server 110 which is implemented to run a current server version 120. In addition, distributed environment 100 also includes a plurality of client systems 152, 154, 156 which are connected to server 110 via a plurality of network connections 153, 155, 157. Each of these network connections 153, 155, 157 is connected at one end to a client system 152, 154, 156 and at an opposite end to server 110 through an open socket 140 associated with current server version 120. Beside being associated with current server version 120, socket 140 is also bound to a static port (not shown), and is "listened on" by current server version 120. Thus through the implementation of this particular example, client calls made by client systems 152, 154, 156 to server 110 are transmitted through network connections 153, 155, 157 to the static port and socket 140, where they are received by server 110 and processed by current server version 120.

During the course of operation, as noted above, it often becomes necessary to update the current server version 120 in order to, for example, implement enhanced functionality provided by a new server version 130. In accordance with the principles of the present invention, this updating generally involves switching from current server version 120 to new server version 130 while leaving open socket 140. This process is described in greater detail below with reference to FIG. 2.

Figure 2:
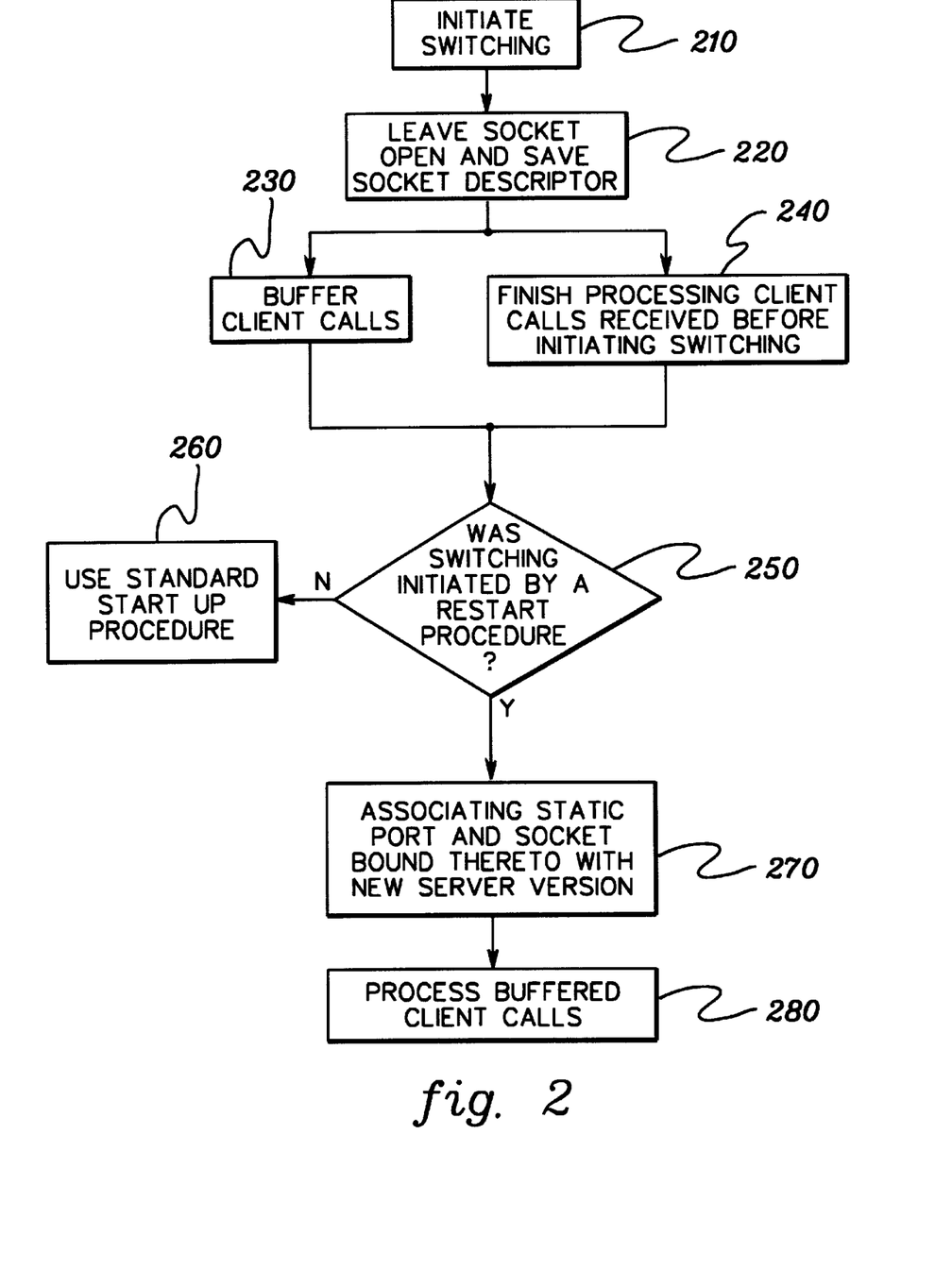
FIG. 2 depicts one example of a logic block diagram for providing continuous server service, in accordance with the principles of the present invention.

Referring now to FIG. 2, which illustrates one example of the present invention, STEP 210 denotes an action or request to deactivate and restart server 110 with new server version 130. In particular, server 110 commences or initiates switching upon the detection of such a request or action. In one embodiment, these detections or checks occur based on two independent schedules or detection schemes. Specifically, a first check is made after each client call is dispatched to be processed by server 110, and if a restart request is detected, the client call is processed and then restart is commenced. In addition to this first check, a periodic second check is also made according to a timer or timer thread so that restart requests may be detected in the absence of client calls.

After initiating switching, socket 140 (which as mentioned above is associated with current server version 120) is left open, STEP 220. At the same time, current server version 120 stops listening on socket 140 and deactivation and activation of current server version 120 and new server version 130 are respectively commenced.

By leaving socket 140 open with the respective commencement of deactivation and activation of current server version 120 and new server version 130, client calls made after initiating switching are not returned with error messages to the client systems 152, 154, 156. Instead, the client calls continue to be received by server 110 through socket 140. However, because current server version 120 has commenced deactivation, client calls made after the initiation of switching to new server version 130 are not able to be processed by current server version 120. Likewise, because new server version 130 has not yet completed activation, the same client calls are also not yet able to be processed by new server version 130. Thus, in accordance with the principles of the present invention, these client calls made after the initiation of switching and before the completion of switching are buffered by server 110, STEP 230. In this particular example, the client calls are buffered in a queue associated with the static port and socket 140.

In addition to the buffered client calls received after initiation of switching and before completion of the activation of the new server version 130, some additional client calls received before the initiation of switching may also need to be addressed. In this regard, client calls received by server 110 before the initiation of switching are typically processed in an orderly manner by current server version 120. But because it is not known when a restart request will be received and because the time required to fully process a client request varies according to the services required by the particular client call, it is conceivable that restart requests could be received while a client call is in the middle of being processed. In these cases, the client calls will not yet have had an opportunity to be fully processed when switching commences. To address this issue, current server version 120 remains active long enough, after switching initiates, to finish processing any client calls received before the initiation of switching, STEP 240. In this manner, client calls received before the initiation of switching, which are not yet fully processed, are not lost during switching.

Switching from the current server version 120 to the new server version 130 subsequently continues with server 110 determining whether switching was initiated by a restart procedure, INQUIRY 250. If server 110 determines that switching was not initiated by a restart procedure, for example because switching was initiated by an actual startup request, server 110 follows standard startup procedures (e.g., open new socket, bind port to socket, and listen on new socket), STEP 260. On the other hand, if server 110 determines that switching was initiated by a restart procedure, the static port and socket 140 are associated with the new server version 130, STEP 270. Specifically, before current server version 120 completes deactivation, current server version 120 saves information including socket descriptors relating to the identification of the socket 140. Furthermore, the socket descriptors of any open sockets are saved. After saving these socket descriptors, current server version 120 completes deactivation. These socket descriptors are then retrieved by new server version 130 and are used by new server version 150 to identify socket 140 (or any other sockets which may have been open). Socket 140, along with the static port bound thereto, are then associated with new server version 130. Thus by saving and later retrieving the socket descriptors, the socket descriptors may be utilized by the new server version 130 to reuse socket 140 (and any other open sockets) and hence new server version 130 avoids having to open a new socket during which time incoming client calls would be lost.

After associating the static port and socket 140 with the new server version 130, new server version 130 begins listening on socket 140 and processes the buffered client calls received after initiating switching, STEP 280. Shortly afterwards, switching and activation of new server version 130 become complete and server 110 resumes processing client calls and again begins to check for restart requests.

Figure 3:
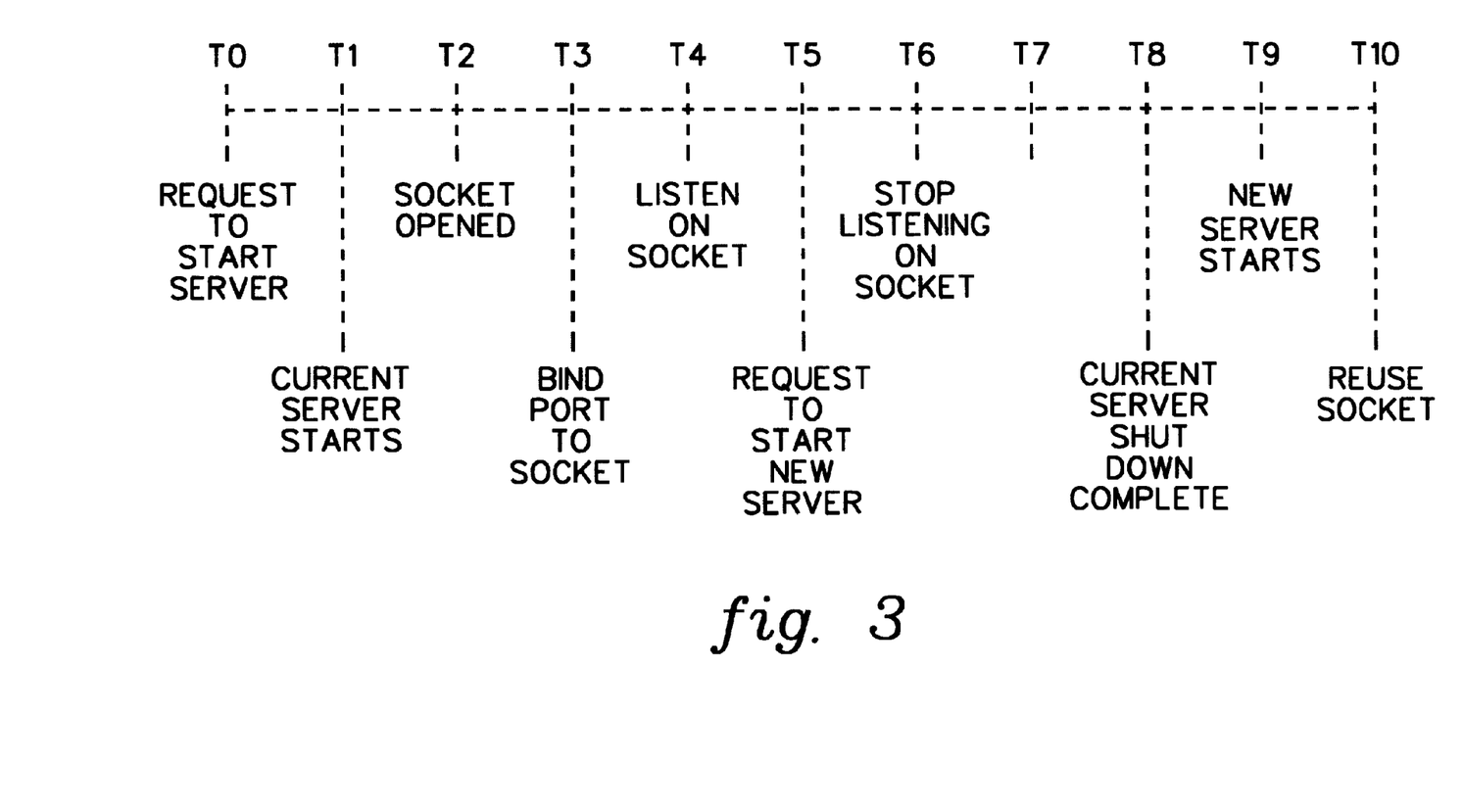
FIG. 3 depicts a time line illustrating one process example of providing continuous server service, in accordance with the principles of the present invention.
Figure 4:
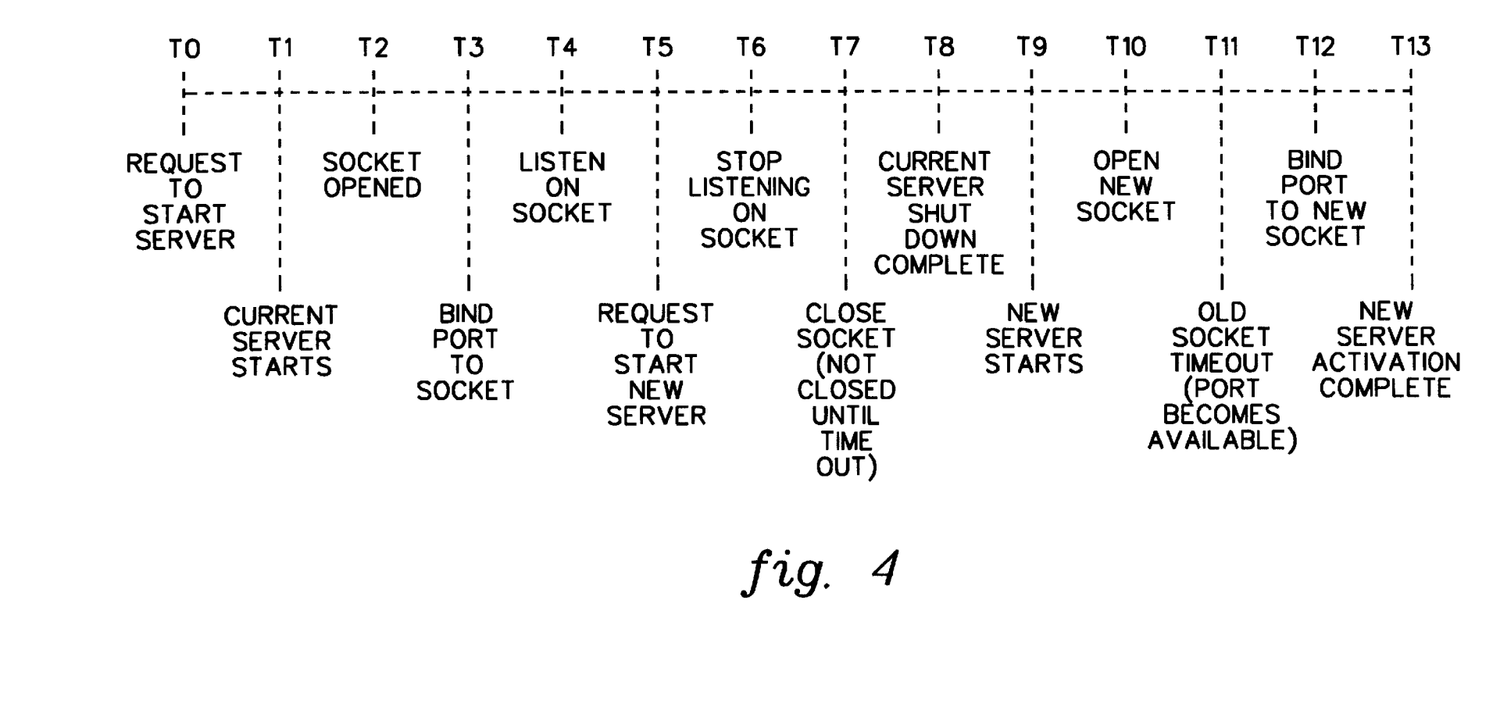
FIG. 4 depicts a time line illustrating one process example of switching server versions.
Figure 5:
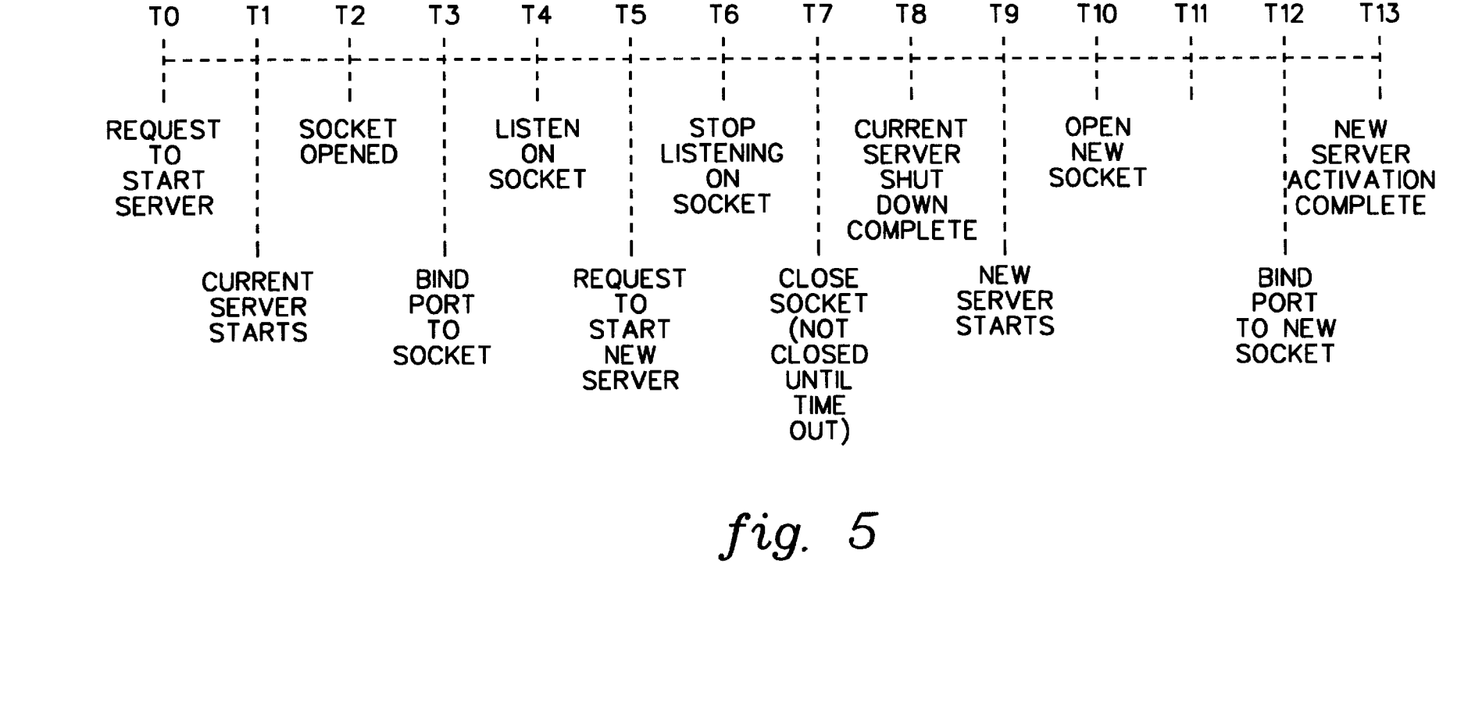
FIG. 5 depicts a time line illustrating another process example of switching server versions.

Examples of the continuous server service capability of the present invention are now discussed with reference to the time lines depicted in FIGS. 3–5. Initially, times T0–T6 in each of FIGS. 3–5 are identical, and in this regard, times T0–T4 illustrate a standard startup procedure. In particular, a request to start server 110 is received at time T0 and is followed by the activation of server 110 running current server version 120 at time T1. At time T2, socket 140 is opened, and is subsequently bound to the static port at time T3. After socket 140 is bound to the static port, current server version 120 begins listening on socket 140, denoted by time T4, and the activation of server 110 becomes complete. Therefore, in each of FIGS. 3–5, client calls begin to be received after time T4.

Times T5 and T6 in each of FIGS. 3–5 are also identical and illustrate the initial steps of the updating or switching procedure. Specifically, a request to switch from current server version 120 to new server version 130 is detected by server 110 at time T5, and as a result causes server 110 to initiate switching. Subsequent to the initiation of switching, current server version 120 stops listening on socket 140, time T6. Consequently, as current server version 120, in each of FIGS. 3–5, begins listening on socket 140 at time T4 and does not stop listening until time T6, any client calls made between time T4 and time T6 will be received and processed by current server version 120.

Focusing now on FIGS. 4 and 5, times T7–T10 illustrate the completion of deactivation of current server version 120 and the initial steps of activation of new server version 130. At time T7, current server 120 closes socket 140 and as a result causes client calls received at that time to be rejected with a communication error. Sometime after time T7, current server version 120 completes deactivation, denoted in FIGS. 4 and 5 as time T8, and new server version 130 begins activation, denoted in FIGS. 4 and 5 as time T9. In addition, although FIGS. 4 and 5 show completion of deactivation of current server version 120 time T8 occurring before initiation of activation of new server version 130 time T9, the order of the two steps may be reversed. Next, at time T10, new server version 130 opens a new socket (not shown) which will, in turn, be used to receive client calls as discussed below.

Focusing again on FIGS. 4 and 5, times T11–T13 illustrate the completion of activation of new server version 130 and also the completion of switching. Addressing, first, the example shown in FIG. 4, before the new server version 130 of FIG. 4 may begin receiving client calls, two requirements must be satisfied. Specifically, socket 140 must first be closed or "timed out" to free up-or make available the static port, and then, the static port must be bound to the new socket. Thus, in the example of FIG. 4, socket 140 is timed out at time T11, and then, the static port is bound to the new socket at time T12. To complete the activation of new server version 130 and hence to complete switching, new server version 130 associates itself with the static port and the new socket at time T13. At that time, new server version 130 begins listening on the new socket, and also subsequently begins receiving client calls, and processing newly received client calls. Thus, as client calls are not received by new server version 130 until time T13, in the example of FIG. 4, client calls made between time T6, when current server version 120 stops listening on socket 140, and time T13 are rejected with communication errors and are not processed. Finally, although FIG. 4 shows socket 140 timing out after time T10, the exact occurrence of time out T11 may occur any time after time T7.

Addressing, next, the example shown in FIG. 5, a socket address reuse option is utilized and, as a result, alleviates the need for socket 140 to time out before the static port may be bound to the new socket. Hence, in this example, the static port is bound to the new socket at time T12 without having to wait for socket 140 to time out. Then at time T13, new server version 130 associates itself with the static port and the new socket, and, like the example of FIG. 4, begins listening on the new socket, receiving client calls, and processing newly received client calls, thereby completing activation. Thus, as with the example of FIG. 4, client calls made between time T6 and T13 are rejected with communication errors and are not processed.

Turning now to the example illustrated in FIG. 3, after current server version 120 stops listening on socket 140 at time T6, socket 140 is not closed, as was the case in the examples of FIGS. 4 and 5. Instead, socket 140 remains open and calls received after time T6 are buffered by server 110. Consequently, client calls received after time T6 are not rejected with communication errors. Then, subsequent to time T6, the example of FIG. 3 proceeds with the completion of deactivation of current server version 120, denoted by time T8, and with the initiation of activation of new server version 130, denoted by time T9. Also at this time, during this deactivation and activation, the socket descriptor of socket 140 is saved by current server version 120 and later retrieved by new server version 130 for use in reusing socket 140. Furthermore, as with the examples of FIGS. 4 and 5, although FIG. 3 shows the completion of deactivation of current server version 120 time T8 occurring before the initiation of activation of new server version 130 time T9, the relative order of the two steps may be reversed. Then at time T10, using the socket descriptor saved by current server version 120, new server version 130 associates itself with socket 140 and the static port, and subsequently begins listening on the new socket, receiving client calls, and processing newly received client calls. However, in addition to beginning to listen on socket 140, the example of FIG. 3 also processes any client calls buffered between time T6 and time T10. As a result, no client calls are rejected, and continuous server service is provided.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for providing continuous server service during switching from a current server version to a new server version, said current server version receiving client calls through an associated static port with a socket bound thereto, said method comprising:

initiating switching from the current server version to the new server version while maintaining said socket open for receiving client calls;

buffering any received client calls during switching from the current server version to the new server version; and upon switching to said new server version, associating the open socket with the new server version using open socket identifying information for the current server version, and processing any buffered client calls.

2. The method of claim 1, wherein any client calls received before said initiating switching are processed completely by said current server version before switching is finished, and client calls received after said initiating switching but before switching is complete are buffered and processed by said new server version after switching is complete.

3. The method of claim 1, wherein said associating comprises said current server version saving information identifying said socket, and said new server version retrieving said information and utilizing said information to reuse said socket.

4. The method of claim 1, further comprising receiving, by said socket, client calls made after switching as well as client calls made before switching.

5. The method of claim 1, further comprising running said current server version a aid new server version on a remote procedure call server.

6. The method of claim 1, further comprising processing said buffered calls by said new server version.

7. The method of claim 1, further comprising determining whether switching was initiated by a restart procedure, and upon a determination that switching was initiated by a restart procedure, utilizing said associated static port with a socket bound thereto to receive client calls.

8. The method of claim 1, further comprising checking for conditions to initiate switching periodically according to a timer thread and with each client call received.

9. A method for providing continuous server service during switching from a current server version to a new server version, said current server version receiving client calls through an associated static port with a socket bound thereto, said method comprising:

receiving client calls during switching from said current server version to said new server version by leaving said socket open;

associating said static port with said socket bound thereto with said new server version using open socket identifying information for the current server version; and processing, by said new server version, any client calls received during switching so that no client calls are lost.

10. The method of claim 9, wherein any client calls received before switching is initiated are processed completely by said current server version before switching is finished, and client calls received after switching is initiated but before switching is complete are buffered and processed by said new server version after switching is complete.

11. The method of claim 9, wherein said associating comprises said current server version saving information identifying said socket, and said new server version retrieving said information and utilizing said information to reuse said socket.

12. The method of claim 9, further comprising receiving, by said socket, client calls made after switching as well as client calls made before switching.

13. The method of claim 9, further comprising running said current server version and said new server version on a remote procedure call server.

14. The method of claim 9, further comprising determining whether switching was initiated by a restart procedure, and upon a determination that switching was initiated by a restart procedure, utilizing said associated static port with a socket bound thereto to receive client calls.

15. The method of claim 9, further comprising checking for conditions to initiate switching periodically according to a timer thread and with each client call received.

16. A system capable of providing continuous server service during switching from a current server version to a new server version, said system comprising:
a server having a static port with a socket bound thereto which is associated with said current server version, said server being operable to leave said socket open when said current server version is switched to said new server version so that said server is able to continue to receive client calls received through said socket during switching, said server further comprising a buffer adapted to queue client calls received during switching from said current server version to said new server version, wherein said server is adapted to have said open socket associated with the new server version using open socket identifying information for the current server version and have the new server version process any queued client calls received during switching after switching to said new server is complete.

17. The system of claim 16, wherein said server is adapted to have said current server version complete processing of any client calls received before switching is finished, and to have said new server version process client calls received after switching is initiated but before switching is complete.

18. The system of claim 16, wherein said server is adapted to associate said static port with said socket bound thereto with said new server version by forwarding information identifying said socket to said new server version, thereby allowing reuse of said socket.

19. The system of claim 16, wherein said socket is adapted to receive client calls made after switching as well as client calls made before switching.

20. The system of claim 16, wherein said server is a remote procedure call server.

21. The system of claim 16, wherein said server is further adapted to determine whether switching was initiated by a restart procedure and to utilize said static port with a socket bound thereto to receive client calls, upon a determination that switching was initiated by a restart procedure.

22. The system of claim 16, wherein said server is further adapted to check for conditions to initiate switching periodically according to a timer thread and with each client call received.

23. A system for providing continuous server service during switching from a current server version to a new server version, said current server version receiving client calls through an associated static port with a socket bound thereto, said system comprising:
means for initiating switching from the current server version to the new server version while maintaining said socket open for receiving client calls;
means for buffering any received client calls during switching from the current server version to the new server version; and
means for processing, upon switching to said new server version, any buffered client calls and for associating the open socket with the new server version using open socket identifying information for the current server version.

24. The system of claim 23, further comprising:
means for processing completely any client calls received before said initiating switching.

25. The system of claim 23, wherein said means for associating comprises:
means for saving information identifying said socket; and
means for retrieving said information and utilizing said information to reuse said socket.

26. The system of claim 23, wherein said server is a remote procedure call server.

27. The system of claim 23, further comprising means for determining whether switching was initiated by a restart procedure, and upon a determination that switching was initiated by a restart procedure, utilizing said associated static port with a socket bound thereto to receive client calls.

28. The system of claim 23, further comprising means for checking for conditions to initiate switching periodically according to a timer thread and with each client call received.

29. A system for providing continuous server service during switching from a current server version to a new server version, said current server version receiving client calls through an associated static port with a socket bound thereto, said system comprising:
means for receiving client calls during switching from said current server version to said new server version by leaving said socket open;
means for associating said static port with said socket bound thereto with said new server version using open socket identifying information for the current server version; and
means for processing, by said new server version, any client calls received during switching so that no client calls are lost.

30. The system of claim 29, further comprising means for processing completely any client calls received before said initiating switching.

31. The system of claim 29, further comprising means for receiving, by said socket, client calls made after switching as well as client calls made before switching.

32. The system of claim 29, wherein said server is a remote procedure call server.

33. The system of claim 29, further comprising means for determining whether switching was initiated by a restart procedure, and upon a determination that switching was initiated by a restart procedure, utilizing said associated static port with a socket bound thereto to receive client calls.

34. The system of claim 29, further comprising means for checking for conditions to initiate switching periodically according to a timer thread and with each client call received.

35. An article of manufacture comprising:
a computer useable medium having computer readable program code means embodied therein for causing the providing of continuous server service during switching from a current server version to a new server version, said current server version receiving client calls through an associated static port with a socket bound thereto, the computer readable program code means in said article of manufacture comprising:
- computer readable program code means for causing initiating switching from the current server version to the new server version while maintaining said socket open for receiving client calls;
- computer readable program code means for causing buffering of any received client calls during switching from the current server version to the new server version; and
- computer readable program code means for causing, upon switching to said new server version, associating the open socket with the new server version using open socket identifying information for the current server version, and processing of any buffered client calls.

36. The article of manufacture of claim 35, further comprising computer readable program code means for causing a computer to effect processing completely any client calls received before said initiating switching by said current server version before switching is finished, and buffering and processing client calls received after said initiating switching but before switching is complete by said new server version.

37. The article of manufacture of claim 35, wherein said computer readable program code means for causing a computer to effect associating further comprises computer readable program code means for causing said current server version to save information identifying said socket, and said new server version to retrieve said information and utilize said information to reuse said socket.

38. The article of manufacture of claim 35, further comprising computer readable program code means for causing a computer to effect receiving, by said socket, client calls made after switching as well as client calls made before switching.

39. The article of manufacture of claim 35, further comprising computer readable program code means for causing a computer to effect running said current server version and said new server version on a remote procedure call server.

40. The article of manufacture of claim 35, further comprising computer readable program code means for causing a computer to effect processing said buffered calls by said new server version.

41. The article of manufacture of claim 35, further comprising computer readable program code means for causing a computer to effect determining whether switching was initiated by a restart procedure, and upon a determination that switching was initiated by a restart procedure, utilizing said associated static port with a socket bound thereto to receive client calls.

42. The article of manufacture of claim 35, further comprising computer readable program code means for causing a computer to effect checking for conditions to initiate switching periodically according to a timer thread and with each client call received.

43. An article of manufacture comprising:
a computer useable medium having computer readable program code means embodied therein for causing the providing of continuous server service during switching from a current server version to a new server version, said current server version receiving client calls through an associated static port with a socket bound thereto, the computer readable program code means in said article of manufacture comprising:
- computer readable program code means for causing receiving client calls during switching from said current server version to said new server version by leaving said socket open;
- computer readable program code means for causing associating of said static port with said socket bound thereto with said new server version using open socket identifying information for the current server version; and
- computer readable program code means for causing processing, by said new server version, of any client calls received during switching so that no client calls are lost.

44. The article of manufacture of claim 43, further comprising computer readable program code means for causing a computer to effect processing completely any client calls received before said initiating switching by said current server version before switching is finished, and buffering and processing client calls received after said initiating switching but before switching is complete by said new server version.

45. The article of manufacture of claim 43, further comprising computer readable program code means for causing a computer to effect said current server version saving information identifying said socket, and said new server version retrieving said information and utilizing said information to reuse said socket.

46. The article of manufacture of claim 43, further comprising computer readable program code means for causing a computer to effect receiving, by said socket, client calls made after switching as well as client calls made before switching.

47. The article of manufacture of claim 43, further comprising computer readable program code means or causing a computer to effect running said current server version and said new server version on a remote procedure call server.

48. The article of manufacture of claim 43, further comprising computer readable program code means for causing a computer to effect determining whether switching was initiated by a restart procedure, and upon a determination that switching was initiated by a restart procedure, utilizing said associated static port with a socket bound thereto to receive client calls.

49. The article of manufacture of claim 43, further comprising computer readable program code means for causing a computer to effect checking for conditions to initiate switching periodically according to a timer thread and with each client call received.

* * * * *

UNITED STATES PATENT AND TRADEMARK OFFICE
CERTIFICATE OF CORRECTION

PATENT NO.    : 6,622,159 B1  
DATED         : September 16, 2003  
INVENTOR(S)   : Chao et al.

It is certified that error appears in the above-identified patent and that said Letters Patent is hereby corrected as shown below:

<u>Column 8,</u>
Line 45, delete the words "a aid" and insert the word -- said --

Signed and Sealed this

Eighteenth Day of November, 2003

JAMES E. ROGAN
*Director of the United States Patent and Trademark Office*